United States Patent [19]
McEwan

[11] Patent Number: 5,661,490
[45] Date of Patent: Aug. 26, 1997

[54] TIME-OF-FLIGHT RADIO LOCATION SYSTEM

[75] Inventor: Thomas E. McEwan, Livermore, Calif.

[73] Assignee: The Regents of the University of California, Oakland, Calif.

[21] Appl. No.: 636,370

[22] Filed: Apr. 23, 1996

Related U.S. Application Data

[63] Continuation-in-part of Ser. No. 300,909, Sep. 6, 1994, Pat. No. 5,510,800, which is a continuation-in-part of Ser. No. 58,398, May 7, 1993, Pat. No. 5,457,394, which is a continuation-in-part of Ser. No. 44,745, Apr. 12, 1993, Pat. No. 5,345,471.

[51] Int. Cl.⁶ .................................................. G01S 1/24
[52] U.S. Cl. ..................... 342/387; 342/386; 342/463; 342/465
[58] Field of Search .................................. 342/387, 388, 342/389, 391, 386, 463, 82, 125, 465

[56] References Cited

U.S. PATENT DOCUMENTS

| | | | |
|---|---|---|---|
| 3,687,556 | 8/1972 | Price et al. | 356/152 |
| 4,161,730 | 7/1979 | Anderson | 343/6.5 R |
| 4,543,580 | 9/1985 | Bent et al. | 343/460 |
| 5,216,429 | 6/1993 | Nakagawa et al. | 342/450 |
| 5,497,160 | 3/1996 | Koehler et al. | 342/145 |
| 5,499,029 | 3/1996 | Bashforth et al. | 342/22 |
| 5,510,800 | 4/1996 | McEwan | 342/387 |

Primary Examiner—Thomas H. Tarcza
Assistant Examiner—Das L. Phan
Attorney, Agent, or Firm—Henry P. Sartorio

[57] ABSTRACT

A bi-static radar configuration measures the direct time-of-flight of a transmitted RF pulse and is capable of measuring this time-of-flight with a jitter on the order of about one pico-second, or about 0.01 inch of free space distance for an electromagnetic pulse over a range of about one to ten feet. A transmitter transmits a sequence of electromagnetic pulses in response to a transmit timing signal, and a receiver samples the sequence of electromagnetic pulses with controlled timing in response to a receive timing signal, and generates a sample signal in response to the samples. A timing circuit supplies the transmit timing signal to the transmitter and supplies the receive timing signal to the receiver. The receive timing signal causes the receiver to sample the sequence of electromagnetic pulses such that the time between transmission of pulses in the sequence and sampling by the receiver sweeps over a range of delays. The receive timing signal sweeps over the range of delays in a sweep cycle such that pulses in the sequence are sampled at the pulse repetition rate, and with different delays in the range of delays to produce a sample signal representing magnitude of a received pulse in equivalent time. Automatic gain control circuitry in the receiver controls the magnitude of the equivalent time sample signal. A signal processor analyzes the sample signal to indicate the time-of-flight of the electromagnetic pulses in the sequence. The sample signal in equivalent time is passed through an envelope detection circuit, formed of an absolute value circuit followed by a low pass filter, to convert the sample signal to a unipolar signal to eliminate effects of antenna misorientation.

12 Claims, 7 Drawing Sheets

TIME-OF-FLIGHT RADIO LOCATION SYSTEM

RELATED APPLICATIONS

This application is a continuation-in-part (CIP) of Ser. No. 08/300,909, filed Sep. 6, 1994, now U.S. Pat. No. 5,510,800 which is a continuation-in-part (CIP) of Ser. No. 08/058,398, filed May 7, 1993, now U.S. Pat. No. 5,457,394, issued Oct. 10, 1995, which is a continuation-in-part (CIP) of Ser. No. 08/044,745, filed Apr. 12, 1993, now U.S. Pat. No. 5,345,471, issued Sep. 6, 1994.

The United States Government has rights in this invention pursuant to Contract Number W-7405-ENG-48 between the United States Department of Energy and the University of California for the operation of Lawrence Livermore National Laboratory.

BACKGROUND OF THE INVENTION

1. Field of the Invention

The present invention relates to high resolution position measurement systems, and more particularly to sub-millimeter resolution time-of-flight radio location systems operating over a range of less than about ten feet.

2. Description of Related Art

There are a wide variety of position-sensing technologies available which rely on non-mechanical technologies, such as the following:

(1) Infrared or optical systems that employ TV cameras and complex video tracking algorithms;

(2) Ultrasound systems; and (3) Continuous wave (CW) radio frequency fringe counting and phase measurements systems.

The infrared or optical systems are very expensive and, therefore, are impractical for most commercial applications of position sensing. The ultrasound systems are quite inaccurate and unreliable. The CW radio frequency fringe counting and phase measurement systems suffer severe multi-path problems and ambiguities in the position-sensing data. None of these prior systems provide high resolution, and all are quite expensive.

High resolution, low-cost position-sensing can be applied to the interactive media arts, robotics, automotive occupant position sensing, digital surgery and a wide variety of applications where high resolution position sensing is desired.

SUMMARY OF THE INVENTION

The present invention is based on a bi-static radar configuration which measures the direct time-of-flight of a transmitted RF pulse. This system is capable of measuring time-of-flight with a jitter on the order of about one picosecond, or about 0.01 inch of free space distance for an electromagnetic pulse, over a range of about one to ten feet or more. The system can be implemented with very low-cost components, so it can be used in high-volume computer games and virtual reality systems.

The invention can be characterized as an apparatus for measuring time-of-flight of an electromagnetic pulse. This apparatus is comprised of a transmitter, which transmits a sequence of electromagnetic pulses in response to a transmit timing signal, and a receiver, which samples the sequence of electromagnetic pulses with controlled timing in response to a receive timing signal and generates a sample signal in response to the samples. A timing circuit supplies the transmit timing signal to the transmitter and supplies the receive timing signal to the receiver. The receive timing signal causes the receiver to sample the sequence of electromagnetic pulses such that the time between transmission of pulses in the sequence and sampling by the receiver sweeps over a range of delays. A sample signal produced by the detection circuitry indicates the time-of-flight between the transmitter and the receiver of pulses in the sequence in response to the sample signal and the timing circuit. The receive timing signal sweeps over the range of delays in a sweep cycle such that pulses in the sequence are sampled at the pulse repetition rate, and with different delays in the range of delays to produce a sample signal representing magnitude of a received pulse in equivalent time. Automatic gain control circuitry in the receiver controls the magnitude of the equivalent time sample signal. A signal processor analyzes the sample signal to indicate the time-of-flight of the electromagnetic pulses in the sequence. For instance, the system may include a pulse detection signal which generates a pulse detect signal in response to the sample signal when the sample signal reaches a threshold during a sweep over the range of delays. The time between beginning of a sweep and generation of the pulse detect signal indicates the time-of-flight of the pulses in the sequence.

In one aspect of the invention, the timing circuit includes a pulse-rate clock, a cable, having a known cable delay time connecting the pulse-rate clock to the transmitter, and a circuit in the transmitter which translates the pulse-rate clock from the cable into the transmit timing signal. A controlled delay circuit coupled with the pulse-rate clock produces the receive timing signal at the receiver in response to the pulse-rate clock, delayed in time to compensate for the cable delay time.

The receive timing signal can be produced using a controllable delay circuit that includes a voltage controlled delay circuit. A voltage ramp generator coupled to the control input of the voltage controlled delay circuit causes a sweep in the delay of the receive timing signal. The voltage ramp generator may be implemented using a digital-to-analog converter, or using analog ramp generators. In one embodiment, an analog ramp generator is used, which has an exponential transfer characteristic, and the voltage controlled delay circuit implements a complimentary exponential delay in response to the control input to provide a nearly linear delay over the range of delays.

The system may include a plurality of receivers spaced away from one another, such that the position of the transmitter can be detected with several degrees of freedom.

The invention can also be characterized as a method for detecting the position of an object at a range of less than about ten feet. The method is comprised of the following steps:

(1) mounting a transmitter on the object;

(2) transmitting from the transmitter a sequence of electromagnetic pulses;

(3) detecting time-of-flight of the electromagnetic pulses from the transmitter to the receiver; and (4) processing the time-of-flight to indicate the position of the object.

The step of detecting time-of-flight includes sampling the sequence of pulses with controlled timing to produce an equivalent time representation of a transmitted pulse at the receiver, and processing the equivalent time signal to indicate the time-of-flight.

As mentioned above, the present invention operates over a range of time-of-flights of less than ten nanoseconds with excellent accuracy. The system according to the present invention can be implemented with sub-millimeter sensitivity over a range of less than ten feet.

Other aspects and advantages of the present invention can be seen upon review of the figures, the detailed description and the claims which follow.

DETAILED DESCRIPTION OF PREFERRED EMBODIMENTS

Figure 1:
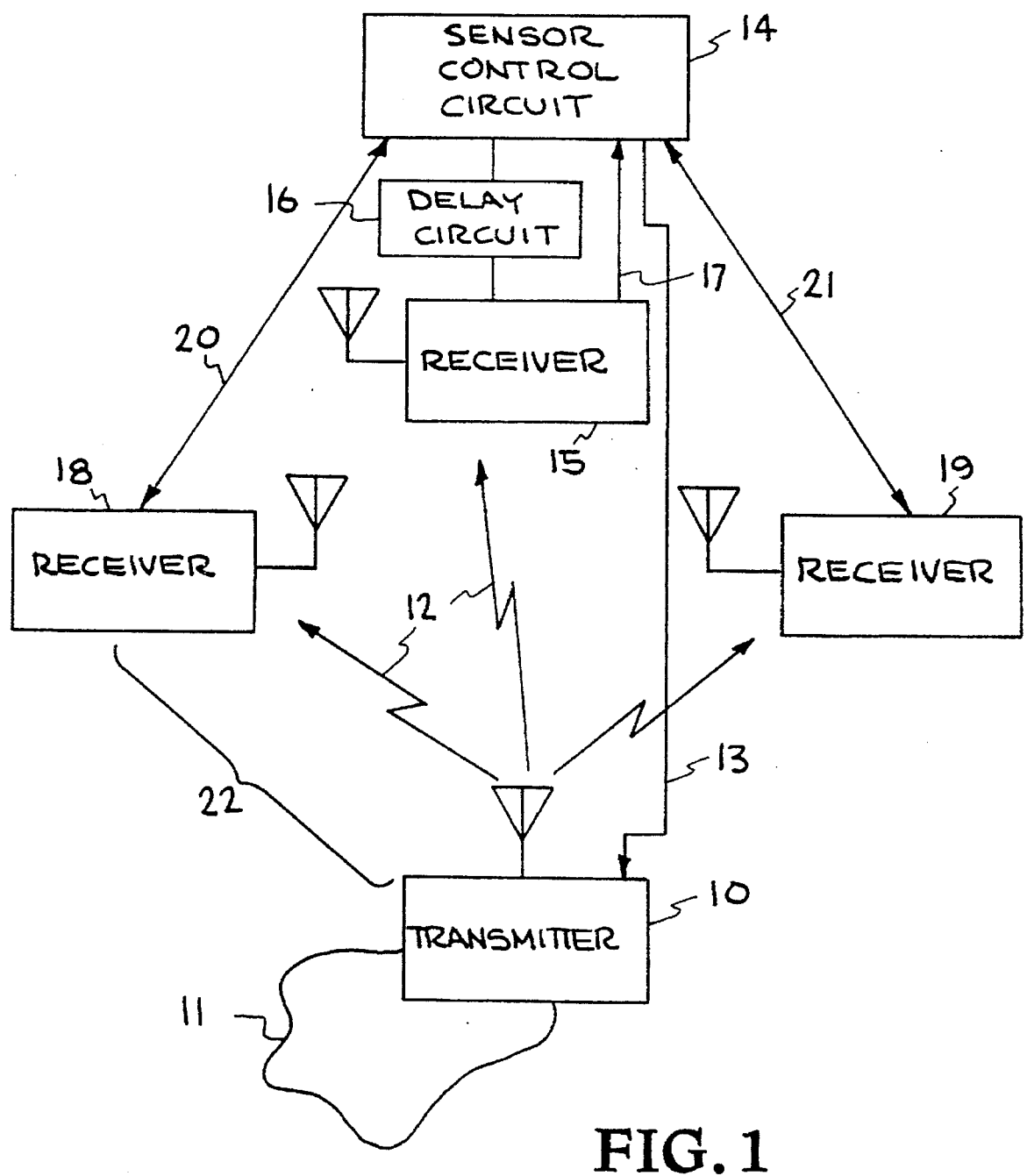
FIG. 1 is a simplified diagram of a position sensor based on direct time-of-flight measurements of electromagnetic pulses according to the present invention.

A detailed description of preferred embodiments of the present invention is provided with reference to the figures, in which FIG. 1 provides an illustration of the basic concept. In particular, a position sensor according to the present invention includes a transmitter 10 which is mounted on an object 11, the position of which is to be sensed. The transmitter 10 generates a sequence of RF pulses 12 in response to a transmit timing signal supplied across a timing cable 13 from a control circuit 14. The receiver 15 coupled to the control circuit 14 includes a sample circuit which samples the RF pulse with controlled timing in response to a receive timing signal. The sensor control circuit 14 supplies the receive timing signal through a controlled delay circuit 16 to the receiver 15 so that the sequence of electromagnetic pulses are sampled with a time between transmitting of pulses from the transmitter 10 and sampling by the receiver 15 precisely controlled and swept over a range of delays. The receiver generates a sample signal on line 17, which is supplied to the sensor control circuit 14 which detects a characteristic of the sample signal to indicate a time-of-flight of the RF pulses 12 from the transmitter 10 to the receiver 15. In the system illustrated in FIG. 1, a first additional receiver 18 and a second additional receiver 19 are included in the system. The receivers 18 and 19 are connected to the control circuit 14 by timing cables 20 and 21, respectively, and also sample the RF pulses 12 with controlled timing. The time-of-flight detected in response to the receivers 15, 18 and 19 can be processed to indicate the position of the object 11 with a number of degrees of freedom and with excellent resolution according to the present invention. Also the range indicated by bracket 22 between the transmitter 10 and the receivers 15, 18, 19 may be less than 10 feet.

Figure 2:
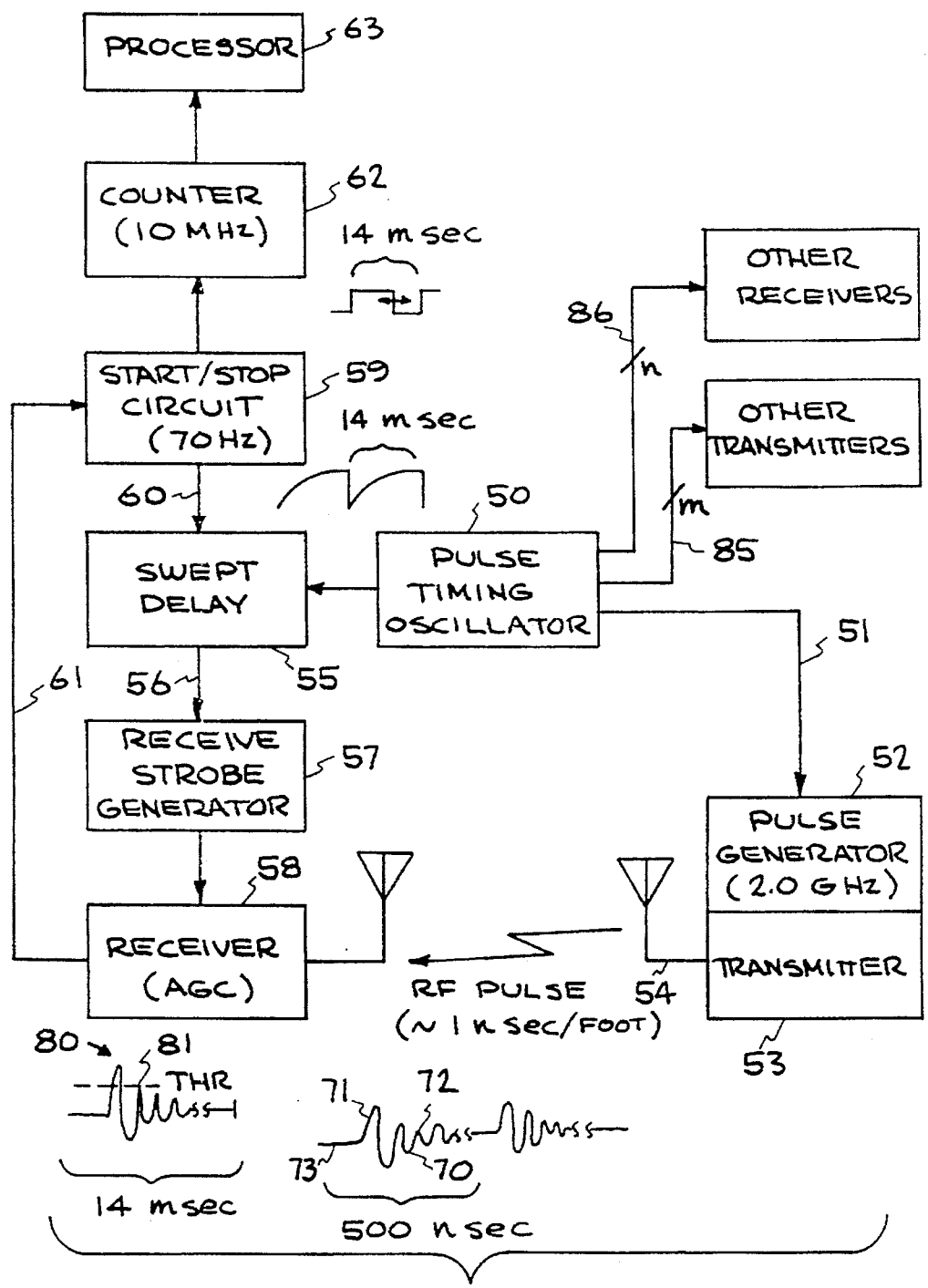
FIG. 2 is a block diagram of the position sensor according to the present invention.

The operation of the sensor according to the present invention can be better understood with respect to the block diagram in FIG. 2. The system is based on a pulse timing oscillator 50 which generates a clock at a pulse repetition rate of about two megahertz in the example to be illustrated with respect to FIG. 2. The pulse rate clock generated by the pulse timing oscillator is supplied across a cable 51 to a pulse generator 52 in the transmitter. The pulse generator generates an RF pulse, such as centered at nominally 2.0 gigaHertz, which is transmitted by the transmitter 53 through antenna 54 with the pulse repetition rate of about two megaHertz.

The pulse timing oscillator 50 is also coupled to a controlled delay circuit 55. The controlled delay circuit 55 supplies a receive timing signal on line 56 to a receive strobe generator 57. The receive strobe generator 57 strobes a sample gate in the receiver 58 at the pulse repetition rate, but at times which are delayed relative to the time that the transmitter emits the RF pulse.

The controlled delay circuit 55 is controlled by a start/stop circuit 59 which includes a sweep oscillator which oscillates at about 70 Hertz in the example described. Thus, the sweep oscillator is designed to oscillate at less than 100 Hertz. An alternative system may be implemented which sweeps at about 16 kiloHertz to be compatible with NTSC video. This oscillator supplies a ramp signal on line 60 to the swept delay circuit 55 to control the timing of the strobes generated by the strobe generator 57. The start/stop circuit 59 generates a start signal at the beginning of each sweep, and a stop signal in response to a pulse detect signal on line 61. The pulse detect signal on line 61 is generated by the receiver 58 in response to the samples of the sequence of RF pulses. When the receiver 58 detects the RF pulse, the pulse detect signal on line 61 causes the start/stop circuit 59 to issue a stop signal. The start signal is used to initiate counter 62 and the stop signal is used to stop the counter 62. The counter begins counting at a count rate of about 10 megaHertz in the example illustrated at the beginning of each sweep, and stops counting upon receiving the stop signal. Thus, the value in the counter 62 upon receiving the stop signal indicates the time-of-flight of an RF pulse from the transmitter to the receiver (the difference between the delay of a strobe pulse at the beginning of a sweep and the delay of a strobe pulse when the pulse detect signal is generated). This value is supplied to processor 63 which uses the information to determine the position of the transmitter 53.

Thus, in the example illustrated, with a 70 Hertz start/stop circuit, a ramp which lasts about 14 milliseconds is produced. The delay between the transmission of an RF pulse by the transmitter, and strobing of the receiver by the receive strobe generator, sweeps over a range in response to the ramp. With a two megaHertz pulse repetition rate, the time between pulses is about 500 nanoseconds. The delay between transmission by the transmitter and reception by the receiver for a 10-foot propagation would be about 10 nanoseconds. Thus, the timing of the receive strobe generated by the receive strobe generator can be swept over a range of delays which begin at a time compensating for cable delay to the transmitter and varies by about 10 nanoseconds in order to precisely detect the position of the transmitter. With a ramp lasting 14 milliseconds, and a pulse repetition rate of two megaHertz, the receiver will sample about 28,600 pulses per sweep of the delay circuit 55.

As illustrated in FIG. 2, the RF pulses at the receiver may have an amplitude which varies as illustrated by trace 70. The 2.0 gigaHertz pulse generator will have a cycle time of about 500 picoseconds, with a rise time on the leading edge of less than 100 picoseconds. The leading edge of the pulse will appear as a strong pulse as indicated at point 71. The strong pulse will be followed by a noise region, generally 72, which is based on reflections and other effects of the transmitted pulse. By the time the second pulse is generated, the noise will have died to a low level as indicated by the region 73 at the beginning of a real-time pulse cycle.

This real-time pulse will be sampled over a range of delay times, such that an equivalent time signal, as illustrated at trace 80, is produced. This trace will assume the shape of the average pulse, however, with a repetition cycle of 70 Hertz for an equivalent time sample width of 14 milliseconds. The equivalent cycle time of the pulse will be about 700 microseconds, for an equivalent time pulse frequency of about 1.4 kiloHertz. Thus, the receiver includes an audio-frequency amplifier with automatic gain control, and a threshold detector. Upon detection of the threshold, such as indicated at point 81, the pulse detection signal is generated on line 61.

Also as illustrated in FIG. 2, the pulse timing oscillator 50 can be connected to other transmitters, such as across cables 85 and other receivers, such as across cables 86 to produce a sophisticated position-detecting system.

The pulse timing oscillator 50 can be frequency modulated, or dithered, for the purpose of reducing interference from similar systems, or other RF devices.

Figure 3:
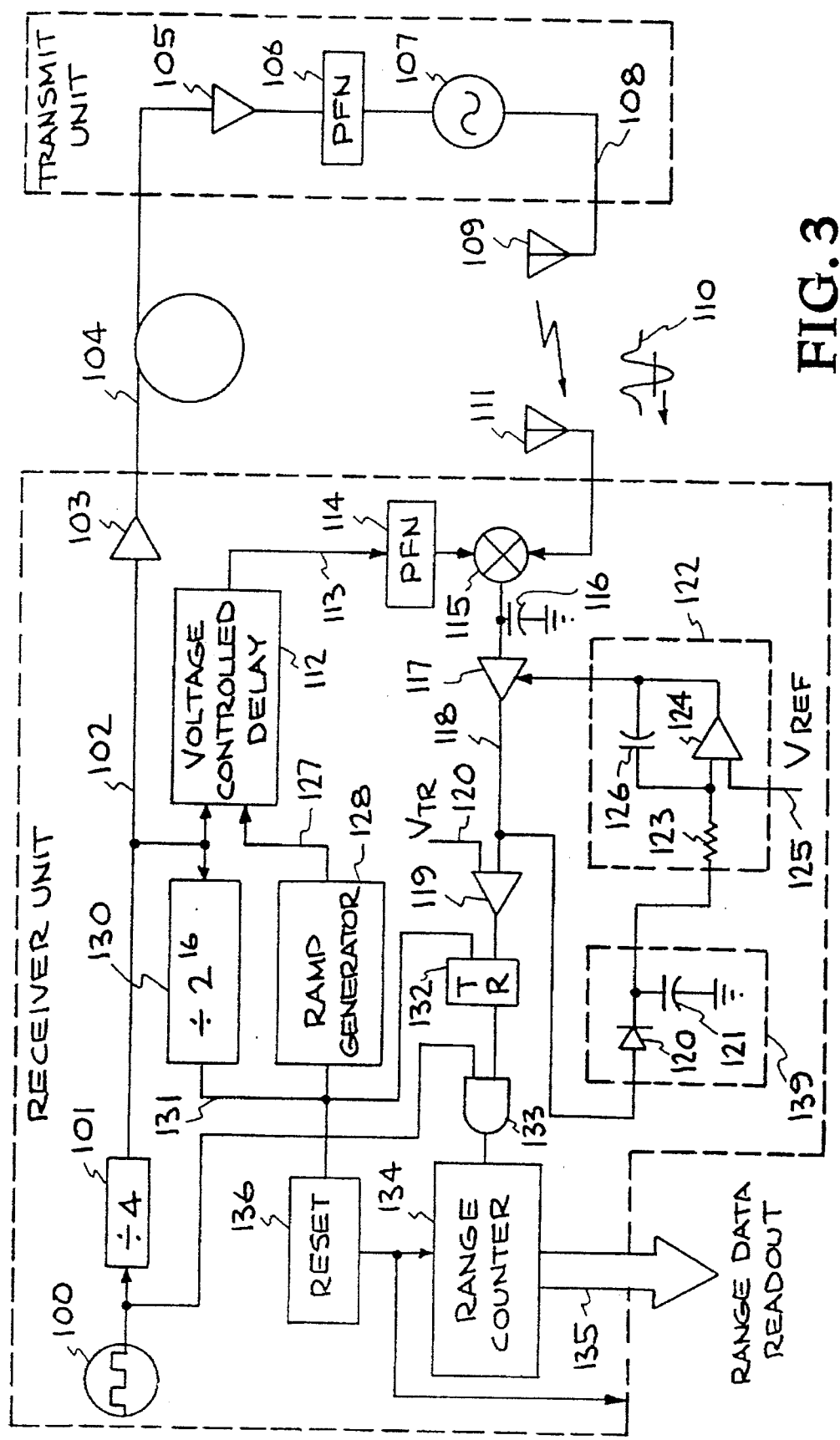
FIG. 3 is a more detailed functional block diagram of a receiver and transmitter in a position detector according to the present invention.

FIG. 3 provides a more detailed schematic diagram of a time-of-flight sensor according to the present invention. In the embodiment of FIG. 3, the pulse repetition frequency of about 2.5 megaHertz is shown, which is generated by a 10 megaHertz clock 100 connected to a divide-by-four circuit 101. The output of the divide-by-four circuit 101 provides a pulse rate clock on line 102. This signal is supplied to a driver 103 coupled to a timing cable 104. The timing cable is connected to the transmit unit, which includes a driver 105, a pulse-forming network 106 which is responsive to the driver 105, and a microwave oscillator 107 which generates, for example, a two gigaHertz, gated RF pulse on line 108. Line 108 is coupled to a transmit antenna 109 which transmits the RF pulse 110 to a receive antenna 111.

The pulse timing signal on line 102, is supplied as a trigger signal to a voltage controlled delay circuit 112. The output of the voltage controlled delay circuit on line 113 drives a pulse-forming network 114 which is used to strobe a sample-and-hold gate 115, which is connected to receive antenna 111 and supplies a sample of the transmitted pulse to a holding capacitance 116. The holding capacitance drives an amplifier 117 to produce a sample signal on line 118. The sample signal is supplied to a comparator 119 which compares the sample signal against a threshold 120. Also, the sample signal line 118 drives a peak-detect circuit 139 which is based on a diode 120 and capacitor 121. The output of the peak-detect circuit is supplied to an amplifier 122 which provides automatic gain control to the amplifier 117. The automatic gain control amp includes an input resistor 123 which is connected to the first input of a differential amplifier 124. The second input of differential amplifier 124 is connected to a reference voltage 125. Capacitor 126 is connected in feedback across the amp 124.

The voltage controlled delay circuit is controlled in response to a ramp signal on line 127, which is supplied by ramp generator 128. The ramp signal on line 127 causes the voltage controlled delay to sweep over a range of delays which corresponds to the delay of the timing cable 104 plus a range of expected time-of-flights from the transmit unit to the receiver. This ramp generator 128 is driven by a ramp clock 130. The ramp clock in the example illustrated is generated by dividing the pulse repetition frequency on line 102 by $2^{16}$ to produce a 40 Hertz signal on line 131. The 40-Hertz signal is coupled to a binary storage element 132. On the leading edge of the ramp clock, the output of the binary 132 is set high, enabling the AND gate 133 to supply the 10 megaHertz clock to a range counter 134. The range counter counts up at the 10 megaHertz rate until the comparator 119 detects that the sample signal on line 118 exceeds the threshold. At that point, the binary storage element 132 is reset, disabling the AND gate 133 and turning off the range counter 134. The data in the range counter can then be supplied out across bus 135 to the signal processor. Also, on the leading edge of each 40 Hertz ramp, a reset signal is supplied to control circuit 136 which resets the counter 134 for a subsequent sweep. Thus, in FIG. 3, a 2.5 megaHertz repetition frequency is derived from the 10 megaHertz clock. The pulse repetition frequency drives the transmit unit through the timing cable, which may be implemented with low-cost phonocables that carry DC power as well as the clock. The transmitter comprises a pulse forming network (PFN) that modulates a gated RF oscillator to generate one cycle of RF as shown at, for example, two gigaHertz center frequency. The RF monocycle propagates from the transmit antenna to the receive antenna. A sample hold circuit in the receive unit samples the receive signal when driven with a gate pulse derived from the voltage controlled delay circuit and a pulse-forming network. The hold circuit output is amplified by an automatic gain controlled amplifier and applied to a threshold comparator. The output of the amplifier 117 is an equivalent time replica of the RF pulse that repeats at a 40 Hertz rate, the sweep rate of the ramp generator.

A peak detector detects the maximum pulse amplitude in the equivalent time sample signal and drives an automatic gain control amplifier to maintain the peak amplitude of the equivalent time pulse at a controlled level, typically −1 peak volts in this example. The comparator is typically set to −0.5 volts to detect the equivalent time pulse at a precise, constant percentage with a maximum level regardless of fluctuation caused by time-of-flight range or antenna orientation.

The equivalent time signal represents a range sweep from one to ten feet as defined by the ramp circuit and the voltage controlled delay circuit. When the ramp starts its sweep, a binary is toggled to start the range counter by gating the 10 megaHertz clock into the range counter. At the point in the sweep where the equivalent time pulse is precisely detected, the range counter is stopped, leaving the exact range count for readout. This cycle is repeated at a 25 millisecond rate. With a 10 megaHertz count rate, 250,000 counts represent full scale, or ten feet, so the digital resolution is in the neighborhood of 0.0006 inches. However, present systems are analog-noise limited to about 0.01 inches at the 25 millisecond update rate. Digital averaging may be employed to decrease jitter.

The voltage controlled delay circuit 112 generates a linear-range sweep over time by employing a primitive exponential, high-speed voltage ramp with the time constant of about 10 nanoseconds. This ramp is combined with a primitive exponential ramp in the ramp circuit. Both the real-time ramp and the equivalent-time ramp operate over the same portions of their curves to jointly provide a linear sweep.

Figure 4:
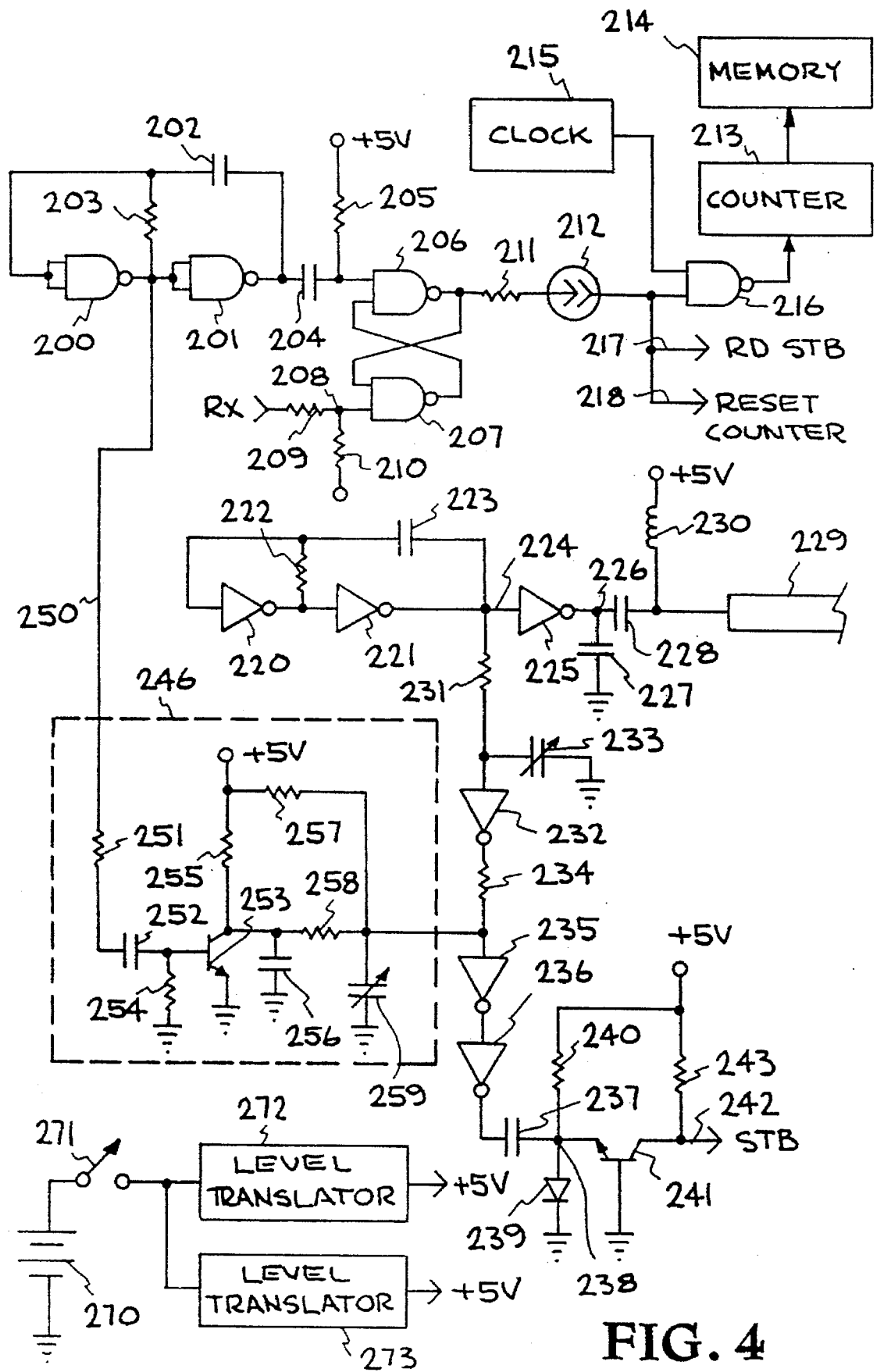
FIG. 4 is an electrical schematic diagram of a timing circuit and other parts of a position sensor according to the present invention.
Figure 5:
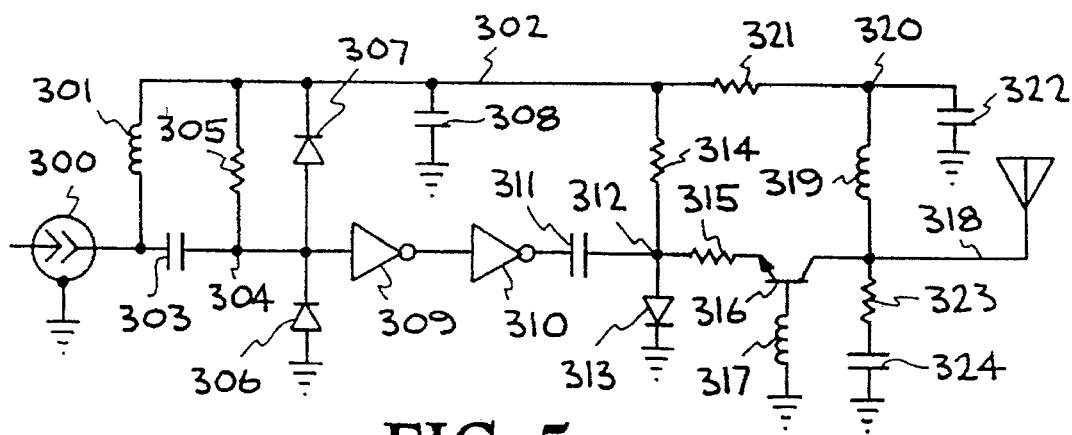
FIG. 5 is an electrical schematic diagram of a transmitter for a position sensor according to the present invention.
Figure 6:
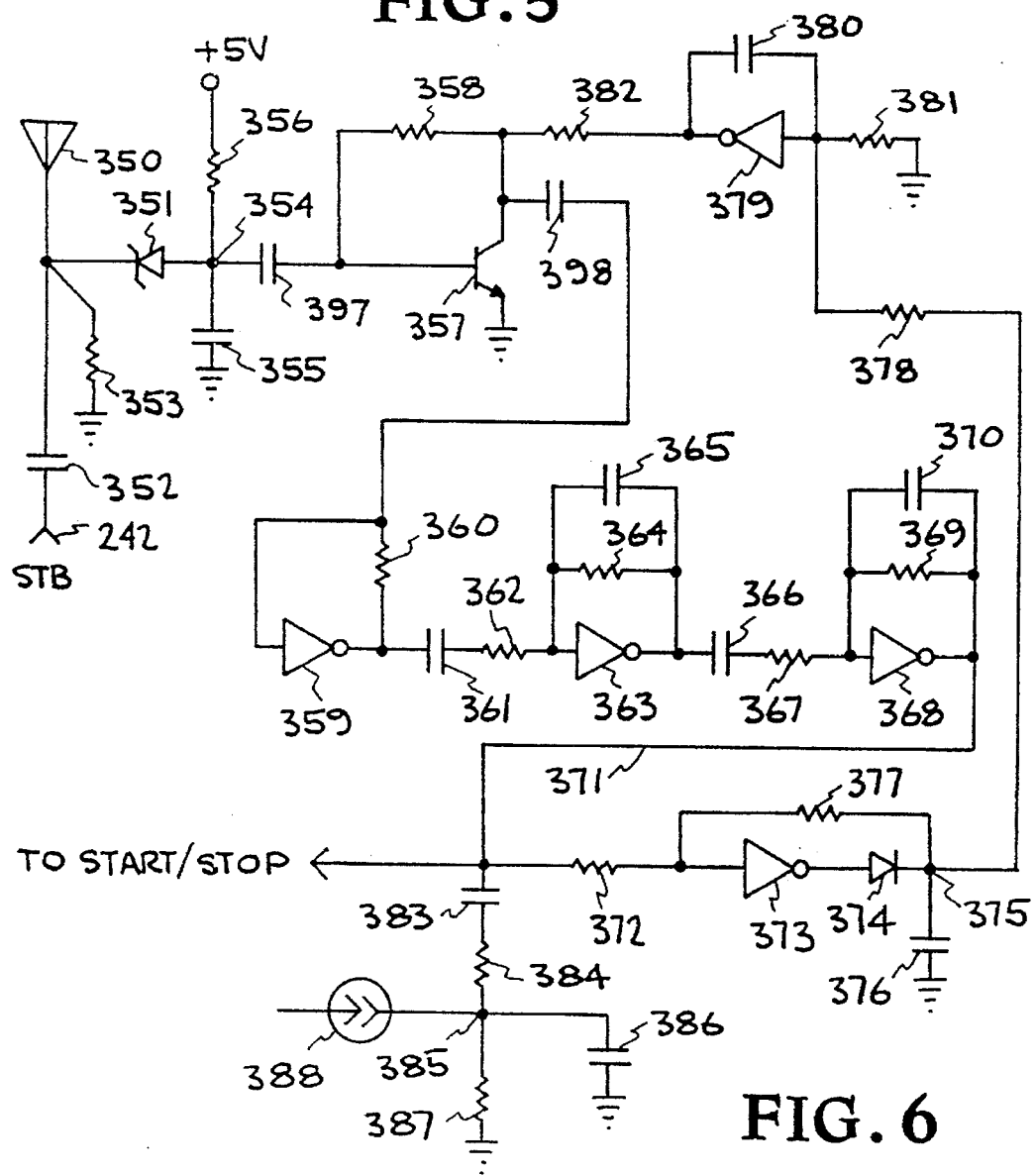
FIG. 6 is an electrical schematic diagram of a receiver for a position sensor according to the present invention.

A representative electrical schematic diagram of another example of a receiver, transmitter and timing circuit are illustrated in FIGS. 4 through 6. FIG. 4 illustrates the timing circuit for the system according to the present invention.

The timing circuit includes a 70 Hertz oscillator, which is formed using NAND gates 200 and 201 which have their inputs connected together to operate as inverters. The first NAND gate 200 has its output connected to the input of the second NAND gate 201. The second NAND gate 201 is connected through a capacitor 202 in feedback to the input of the first NAND gate 200. Also, the output of NAND gate 200 is connected through resistor 203 to its input. This 70 Hertz clock is connected to a flip-flop through the RC differentiator composed of capacitor 204 and resistor 205, which is connected to the positive five-volt supply. The flip-flop is based on NAND gate 206 and NAND gate 207. The output NAND gate 206 is connected to one input of NAND gate 207. The output of NAND gate 207 is connected to one input of NAND gate 206. The first input of NAND gate 206 is the output of the RC circuit based on capacitor 204 and resistor 205. The second input to NAND gate 207 is the output of a threshold detection circuit at node 208. The threshold detection circuit at node 208 is composed of resistor 209, which is connected to receive the sample signal, RX, generated by the receiver described in FIG. 6, and resistor 210, which is connected to the positive five-volt supply.

The output of the flip-flop composed of NAND gates 206 and 207 is supplied through resistor 211 to connector 212. The connector 212 drives the signal processor, which is composed of counter 213 and memory 214. A 10 megaHertz clock 215 drives a NAND gate 216. The second input to the NAND gate 216 is the signal from connector 212, which enables and disables the output of the NAND gate 216 to drive the counter 213. Also, the signal from connector 212 is used as a read strobe for the memory on line 215, and a reset signal on line 216 for resetting the counter by appropriate control circuitry. Thus, the counter is enabled at the beginning of each cycle of the oscillator composed of NAND gates 200 and 201, and turned off when the received sample signal RX falls below a negative threshold.

The system in FIG. 4 also shows the pulse clock composed of inverter 220 and inverter 221. The output of inverter 220 is connected through resistor 222 to its input. The output of inverter 221 is connected through capacitor 223 to the input of inverter 220. The output of inverter 221 is a 2 megaHertz clock on line 224. This signal is supplied through inverter 225 to node 226. Capacitor 227 is connected between node 226 and ground. Capacitor 228 is connected between node 226 and a transmit cable 229 such as an RCA phono plug coupled to a 12-foot coaxial audio-cable. Also, inductor 230 is coupled from cable 229 to the positive five-volt supply in order to supply power to the transmitter across the cable 229 superimposed with the transmit clock.

The pulse clock on line 224 is also supplied to a delay circuit which is connected to line 224 through resistor 231. Resistor 231 is connected to the input of inverter 232 and through variable capacitor 233 to ground. The variable capacitor 233 provides a coarse delay for the pulse clock. The output of inverter 232 is supplied through resistor 234 to the input of inverter 235. The input of inverter 235 is also driven by the ramp generator, generally 246. The output of inverter 235 is supplied through inverter 236 to the receive strobe generator through capacitor 237. Capacitor 237 is connected between the output of inverter 236 and node 238. Diode 239 has its anode connected to node 238 and its cathode connected to ground. Resistor 240 is connected between node 238 and the five-volt supply. Node 238 is also connected to the emitter of high-speed transistor 241. The base of transistor 241 is coupled to ground. The collector of transistor 241 supplies the strobe signal STB on line 242. Also, the collector of transistor 241 is connected through resistor 243 to the positive five-volt supply.

The ramp generator 246 is basically an analog exponential ramp generator. This ramp generator may be replaced by a digital-to-analog converter which digitally supplies a sequence of analog values to the input of inverter 235 to control the delay using synchronous oscillators. In the analog version illustrated, the 70 Hertz clock at the output of the NAND gate 200 is supplied on line 250 through resistor 251 and the capacitor 252 to the base of transistor 253. Also resistor 254 is connected from the base of transistor 253 to ground. Emitter of transistor 253 is coupled to ground. The collector of transistor 253 is connected through resistor 255 to the positive five-volt supply. Also the collector is coupled through capacitor 256 to ground. Resistor 257 is connected from the positive five-volt supply to the input of inverter 235. Resistor 258 is connected from the collector of transistor 253 to the input of inverter 235. Also, controllable capacitor 259 is connected from the input of inverter 235 to ground. This circuit serves to bias the input of inverter 235 to a region in which it has an exponential transfer function. The ramp generator 246 generates a complimentary exponential transfer function to provide overall a linear ramp in delay at the output of inverter 235. Fine control over the span of the range of delays produced is provided by the adjustable capacitor 259.

Also illustrated in FIG. 4 is a battery-based power supply. The power supply includes a battery 270. The battery is connected to a switch 271 which drives level translators 272 and 273 to provide isolated five-volt supplies for the circuit.

Although the transmit timing signal and the receive timing signal are produced using a single clock in the embodiment described, alternative systems may employ timing circuits which have separate synchronized clocks located at the receiver and transmitter, respectively, without a cable tether.

FIG. 5 illustrates the implementation of a transmitter according to the present invention. This transmitter includes a connector 300 which can be connected to the cable 229 illustrated in FIG. 4. This cable supplies DC power and the transmit clock to a pulse-forming network in the transmitter. Thus, connector 300 is coupled through inductor 301 to line 302. Also, the connector 300 is connected through capacitor 303 to node 304. Resistor 305 is connected from node 304 to line 302. Diode 306 has its cathode coupled to node 304 and its anode coupled to ground. Diode 307 has its anode coupled to node 304 and its cathode coupled to line 302. Line 302 is coupled through capacitor 308 to ground. Node 304 is coupled through inverters 309 and 310 in series which shape the incoming signal. The output of inverter 310 is supplied through capacitor 311 to node 312. The anode of diode 313 is coupled to node 312. The cathode of diode 313 is coupled to ground. Node 312 is connected through resistor 314 to line 302. Also, node 312 is connected through resistor 315 to the emitter of a high-speed transistor 316. The base of high-speed transistor 316 is connected through inductor 317 to ground. Collector of transistor 316 is connected to the transmit antenna. 318. Also, the collector is coupled through inductor 319 to node 320. Node 320 is coupled through resistor 321 to line 302 and across capacitor 322 to ground. The transmit antenna 318 is connected through resistor 323 and capacitor 324 to ground. Thus, the transmitter generates a short burst of radio frequency energy at the transmit antenna 318. The antenna may be a vertically polarized antenna, a circularly polarized antenna, antennae based on cross-dipoles or other implementations known in the arts. Also, the antenna may be dithered or otherwise maneuvered to improve sensitivity of the receiver.

The use of the pulsed RF system has a very low average power, complying with FCC Part 15 regulations.

FIG. 6 illustrates a receiver for use with the system of the present invention. The receiver includes a receive antenna 350 and a single diode sample gate based on diode 351. The cathode of diode 351 is connected to the receive antenna 350. Also, the strobe signal from line 242 of FIG. 4 is supplied through capacitor 352 to the cathode 353 diode 351. Resistor 353 is coupled from the cathode of diode 351 to ground. The anode of diode 351 is coupled to node 354. Capacitor 355 holds the sampled voltage between node 354 and ground. A resistor 356 is coupled from node 354 to the positive five-volt supply. Node 354 is connected through capacitor 397 to the base of transistor 357. The emitter of transistor 357 is connected to ground. A resistor 358 is connected in feedback from the collector of transistor 357 to its base. The collector of transistor 357 is connected through capacitor 398 to a sequence of audio amplifiers beginning with inverter 359, having resistor 360 in feedback. The output of inverter 359 is connected through capacitor 361 and resistor 362 to the input of inverter 363. Inverter 363 has resistor 364 and capacitor 365 connected in parallel in feedback from the output to the input. Also, the output of inverter 363 is connected through capacitor 366 and resistor 367 of the input of inverter 368. Inverter 368 has resistor 369 and capacitor 370 connected in feedback in parallel. The output of inverter 368 is an equivalent time sample signal on line 371. This signal is supplied across resistor 372 to the input of inverter 373. The output of inverter 373 is supplied to the anode of diode 374. The cathode of diode 374 is connected to node 375, which is connected across capacitor 376 to ground. Also, a resistor 377 is connected from node 375 to the input of inverter 373. Node 375 is connected through resistor 378 to the input of inverter 379. Inverter 379 has capacitor 380 in feedback and its input is connected across resistor 381 to ground. The output of inverter 379 is connected through resistor 382 to the collector of transistor 357 and provides automatic gain control for the amplifier sequence in response to the voltage generated on capacitor 376.

The equivalent time signal on line 371 is also connected through capacitor 383 and resistor 384 to node 385. Node 385 is connected across capacitor 386 to ground and resistor 387 to ground. It is also connected to a video output connector 388 for connection to an analyzing circuit.

The signal on line 371 is supplied as the equivalent time signal RX to the threshold detector shown in FIG. 4.

The values of the resistors and capacitors are illustrated in FIGS. 4 through 6 for the example circuit shown. The NAND gates are 74HC00 and the inverters are 74AC04, except in the receiver in which the inverters are implemented using MC14069UB inverters.

The sample circuit uses a single-ended, single diode sample gate, which operates with low power and high efficiency for sampling the small signals at the fast rate required by the present invention. Other receiver topologies might be used, such as those described in my co-pending U.S. patent application entitled Ultra-Wide Band Receiver, application Ser. No. 08/044,745, filed Apr. 12, 1993, now U.S. Pat. No. 5,345,471, issued Sep. 6, 1994, owned at the time of invention and currently by the same assignee as the present invention. Such application is incorporated by reference in order to teach alternative receiver topologies.

Figure 7:
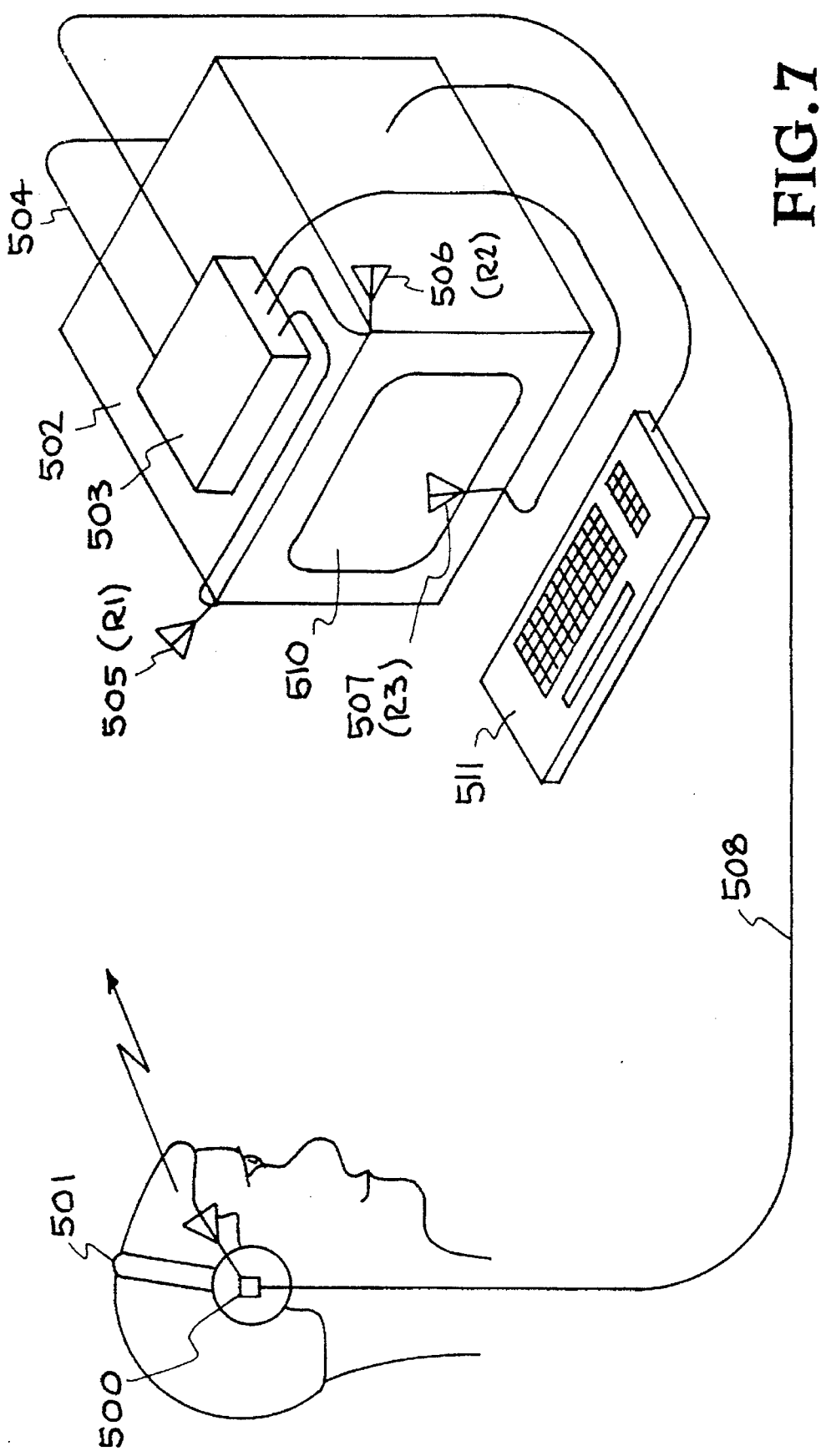
FIG. 7 is a simplified diagram of a head position sensing system implemented according to the present invention.

FIG. 7 illustrates a simple head position sensing system implemented according to the present invention. In this system, a transmitter 500 is mounted on a user's headset 501, worn by a user of a computer system 502. The receiver box 503 is mounted on the computer system 502 and connected across cable 504 to a standard mouse interface. The receiver box 503 includes a first receiver 505, a second receiver 506 and a third receiver 507 each generating a time-of-flight measurement for pulses generated by the transmitter 501. The receiver box 503 produces data indicating the time-of-flight from the transmitter 500 to each of the three receivers 505, 506, 507 can be used for precise position detection of the transmitter 500 mounted on the headset 501. The user is tethered by a small diameter coaxial cable 508 to the receiver box 503 to provide timing in the embodiments described. Computer system 502 includes the standard monitor 510 and keyboard 511 and may be used for executing interactive computer programming based on the position data produced according to the present invention. Various arrangements of the transmitters and receivers may be used to triangulate, providing six axis information: x, y, z in translation and 3 axes of rotation for the transmitter 500.

Accordingly, a very high resolution position sensing system has been provided based on direct time-of-flight measurement of radio frequency pulses. The system is simple and highly accurate, greatly improving over prior systems for providing this type of information.

The system is capable of providing submillimeter resolution made with components costing less than about $10.00. The invention can be applied to interactive media systems, robotics, automotive occupant position sensing, digital surgery, and a wide variety of other applications where high resolution position sensing is desired.

Referring to FIG. 3, an envelope detector 140 can be added to the baseband analog output appearing on line 118 between amplifier 117 and comparator 119 to eliminate a problem that occurs when the orientation of the receive and transmit antennas 111, 109 are not matched, e.g., one is upright and one is inverted. Without the envelope detector 140, the waveform appearing on line 118 becomes inverted when either the transmitter or the receiver antenna becomes inverted relative to the other. This can happen during routine installation or during activities related to position sensing using the device, such as robotics control. When the waveform is inverted, leading edge triggering of comparator 119 occurs on the second receive lobe 142 appearing on line 118 instead of the first receive lobe 141, as shown in FIG. 8, resulting in an error in position determination amounting to ½ an RF cycle, typically about 3 inches.

Figure 8:
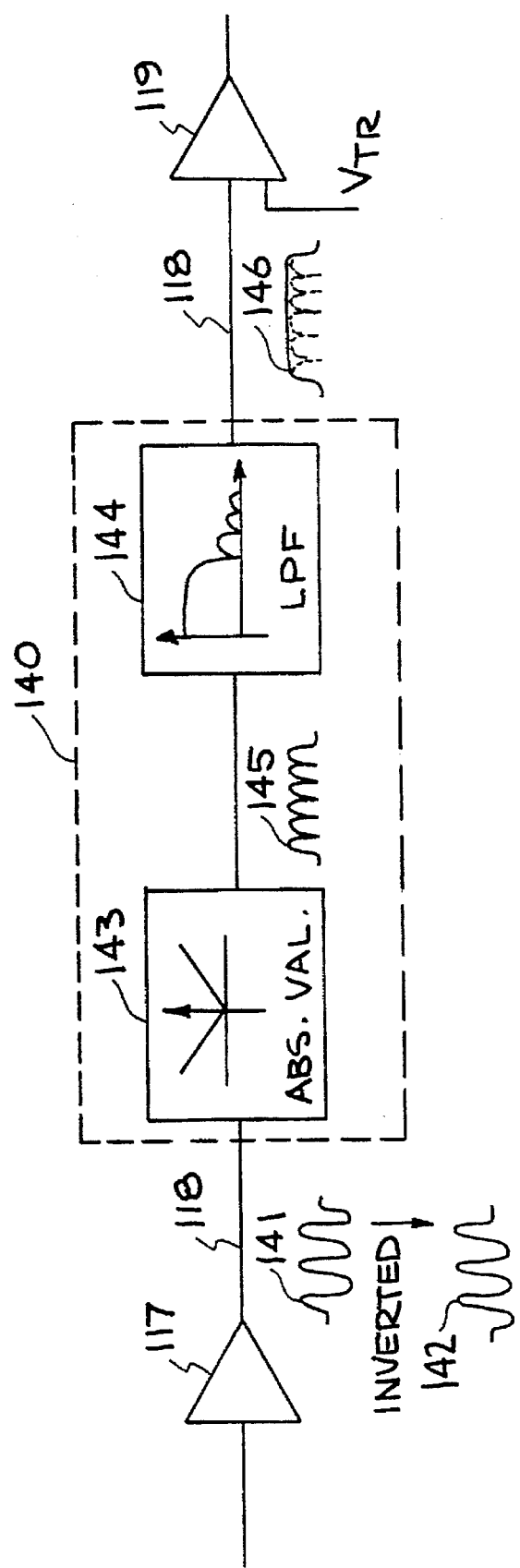
FIG. 8 is a block diagram of an envelope detection circuit.

The envelope detector 140 added between amplifier 117 and comparator 119 on line 118 comprises an absolute value circuit 143 followed by a low pass filter 144, as shown in FIG. 8. Envelope detector 140 resolves this problem by taking the absolute value of the equivalent time signal to make it polarity insensitive. Thus the leading lobe 145 of the absolute value signal is always of the correct polarity. Further, a low pass filter 144 is added to smooth the absolute-value/rectified signal into a clean pulse 146 prior to threshold detection by comparator 119. This process allows for smooth degradation in accuracy should the leading lobe in the received pulse become degraded due to multipath RF propagation or antenna sidelobe nulls. Ideally, low pass filter 144 has a linear phase characteristic in its passband, such as a Bessel characteristic, and a stop band null located at the periodicity of the input signal, such as a Chebychev stop band characteristic.

Antennas (T) 109 and (R) 111 are generally linearly polarized monopoles, dipoles, or horns. However rotational independence can be achieved with circularly polarized antennas, such as cavity-backed spirals or turnstile antennas. Even with these antennas, nulls in the leading edge can occur due to multipath or antenna sidelobe nulls, so the envelope detector 140 can be used for increased positional accuracy.

Changes and modifications in the specifically described embodiments can be carried out without departing from the scope of the invention which is intended to be limited only by the scope of the claims.

What is claimed is:

1. An apparatus for measuring time-of-flight of an electromagnetic pulse, comprising:

a transmitter which transmits a sequence of electromagnetic pulses in response to a transmit timing signal;

a receiver which samples the sequence of electromagnetic pulses with controlled timing, in response to a receive timing signal, and generates a sample signal in response to the samples;

a timing circuit which supplies the transmit timing signal to the transmitter and supplies the receive timing signal to the receiver, the receive timing signal causing the receiver to sample the sequence of electromagnetic pulses such that time between transmission of pulses in the sequence and sampling by the receiver sweeps over a range of delays;

an envelope detector for converting the sample signal to a unipolar signal to eliminate effects of antenna orientation mismatch;

a sample detection circuit which in response to the sample signal and the timing circuit indicates a time-of-flight between the transmitter and the receiver of pulses in the sequence.

2. The apparatus of claim 1 wherein the envelope detector comprises an absolute value circuit followed by a low pass filter.

3. The apparatus of claim 1, wherein the transmit timing signal causes the transmitter to transmit the sequence of electromagnetic pulses at a pulse repetition rate, and wherein the receive timing signal sweeps over he range of delays in a sweep cycle such that pulses in the sequence are sampled at the pulse repetition rate and with different delays in the range of delays, such that the sample signal represents magnitude of a received pulse in the equivalent time.

4. The apparatus of claim 3, wherein the receiver includes automatic gain control circuitry to control magnitude of the sample signal in equivalent time.

5. An apparatus for detecting position of an object, comprising:

a transmitter, for placement on the object, which transmits a sequence of electromagnetic pulses in response to a transmit timing signal;

a receiver which samples the sequence of electromagnetic pulses with controlled timing, in response to a receive timing signal, and generates a sample signal in response to the samples;

a timing circuit which supplies the transmit timing signal to the transmitter and supplies the receive timing signal to the receiver, the receive timing signal causing the receiver to sample the sequence of electromagnetic pulses such that time between transmission of pulses in the sequence by the transmitter and sampling by the receiver sweeps over a range of delays;

an envelope detection circuit for converting the sample signal to a unipolar signal to eliminate effects of antenna orientation mismatch;

a pulse detection circuit which in response to the sample signal and the timing circuit generates a pulse detect signal when the sample signal reaches a threshold during a sweep; and a signal processor, coupled with the pulse detection circuit, to indicate a position of the object in response to the pulse detect signal.

6. The apparatus of claim 5 wherein the envelope detection circuit comprises an absolute value circuit followed by a low pass filter.

7. The apparatus of claim 5, wherein the receiver includes an automatic gain control circuit.

8. The apparatus of claim 5, wherein the transmit timing signal causes the transmitter to transmit the sequence of electromagnetic pulses at a pulse repetition rate, and wherein the receive timing signal sweeps over the range of delays in a sweep cycle such that pulses in the sequence are sampled at the pulse repetition rate and with different delays in the range of delays, such that the sample signal represents magnitude of a received pulse in the equivalent time.

9. The apparatus of claim 8, wherein the receiver includes automatic gain control circuitry to control magnitude of the sample signal in equivalent time.

10. An apparatus for detecting position of an object, comprising:

a transmitter, for placement on the object, which transmits a sequence of microwave pulses in response to a transmit timing signal with a pulse repetition rate greater than about 1 megaHertz, a receiver having an antenna, a sample gate coupled to the antenna, which samples which samples a signal on the antenna at the pulse repetition rate and with controlled timing in response to a receive timing signal, an amplifier coupled to the sample gate including automatic gain control such that pulses in the sequence are sampled to generate an equivalent time sample signal, and an envelope detector for converting the sample signal to a unipolar signal to eliminate effects of antenna orientation mismatch;

a timing circuit which supplies the transmit timing signal to the transmitter and supplies the receive timing signal to the receiver, the receive timing signal causing the receiver to sample the sequence of electromagnetic pulses such that time between transmission of pulses in the sequence by the transmitter and sampling by the receiver sweeps over a range of delays varying by less than 20 nanoseconds in a sweep duration of greater than about 10 milliseconds; and a signal processor, coupled with the receiver, to indicate a, position of the object within a range of less than 10 feet in response to the equivalent time sample signal.

11. The apparatus of claim 10 wherein the envelope detection circuit comprises an absolute value circuit followed by a low pass filter.

12. The apparatus of claim 11 wherein the low pass filter has a passband having a linear phase characteristic and a stop band having a null at the periodicity of the sample signal.

* * * * *